US012749851B2

(12) United States Patent
Yao et al.

(10) Patent No.: US 12,749,851 B2
(45) Date of Patent: Sep. 29, 2026

(54) HIGH-VOLTAGE ENERGY STORAGE QUICK CONNECTOR

(71) Applicants: DINKLE ENTERPRISE CO., LTD., New Taipei City (TW); DINKLE ELECTRIC MACHINERY (CHINA) CO., LTD., Kunshan (CN); LI YANG ELECTRIC MACHINERY (DONGGUAN) CO., LTD., Dong Guan City (CN)

(72) Inventors: Xuehou Yao, Dong Guan City (CN); Yang Li, Dong Guan City (CN); Wei Zhang, Dong Guan City (CN); Xiao Huang, Dong Guan City (CN)

(73) Assignees: DINKLE ENTERPRISE CO., LTD., New Taipei City (TW); DINKLE ELECTRIC MACHINERY (CHINA) CO., LTD., Kunshan (CN); LI YANG ELECTRIC MACHINERY (DONGGUAN) CO., LTD., Dong Guan City (CM)

( * ) Notice: Subject to any disclaimer, the term of this patent is extended or adjusted under 35 U.S.C. 154(b) by 347 days.

(21) Appl. No.: 18/434,750

(22) Filed: Feb. 6, 2024

(65) Prior Publication Data

US 2025/0079768 A1 Mar. 6, 2025

(30) Foreign Application Priority Data

Sep. 4, 2023 (CN) ......................... 202311130736.6
Sep. 4, 2023 (CN) ......................... 202322389209.9

(51) Int. Cl.
*H01R 13/641* (2006.01)
*H01R 13/627* (2006.01)
*H01R 13/631* (2006.01)

(52) U.S. Cl.
CPC ....... *H01R 13/641* (2013.01); *H01R 13/6272* (2013.01); *H01R 13/631* (2013.01)

(58) Field of Classification Search
None
See application file for complete search history.

(56) References Cited

U.S. PATENT DOCUMENTS 4,674,814 A * 6/1987 Hoshino ................ H01R 13/62 439/372
6,012,945 A * 1/2000 Tabor ................. H01R 13/6272 439/489

(Continued)

*Primary Examiner* — Oscar C Jimenez
(74) *Attorney, Agent, or Firm* — HDLS IPR SERVICES; Chun-Ming Shih

(57) ABSTRACT

A high-voltage energy storage quick connector including a socket and a plug. The socket includes a hanging platform with a convex ring located on the outer circumference of the socket. An annular slot is defined on the plug. The socket and the hanging platform are inserted in the annular slot of the plug. The plug includes an elastic hook configured in a cantilever structure on the side wall of the annular slot. The cantilever structure of the elastic hook extends axially along the plug in a free state. A hook of the elastic hook is engaged with a stepped surface of the hanging platform facing away from the plug. The plug includes an operating handle disposed along an elastic deformation direction of the elastic hook, and the operating handle is connected to the plug in a locking manner along the elastic deformation direction of the elastic hook.

8 Claims, 9 Drawing Sheets

(56) References Cited

U.S. PATENT DOCUMENTS

| | | | | |
|---|---|---|---|---|
| 6,024,595 A * | 2/2000 | Saba | H01R 13/641 | 439/352 |
| 6,383,009 B2 * | 5/2002 | Kawase | H01R 13/6272 | 439/352 |
| 2011/0195591 A1 * | 8/2011 | Mumper | H01R 13/6272 | 439/345 |
| 2025/0219315 A1 * | 7/2025 | Xiang | H01R 13/4362 | |

* cited by examiner

HIGH-VOLTAGE ENERGY STORAGE QUICK CONNECTOR

BACKGROUND OF THE DISCLOSURE

Technical Field

The technical field relates to a plug connector, and more particularly relates to a high-voltage energy storage quick connector.

Description of Related Art

A plug-in connector connects to the socket via the plug. The metal clip in the plug and the pin in the socket are elastically clamped and connected to achieve the transmission of electrical signals. To ensure a secure connection and maintain a conductive position after the plug and socket are connected, a ring-shaped hanging platform is disposed on the outer wall of the socket. As shown in FIG. 1, which depicts a cross-sectional schematic view of a plug structure of the related art. An elastic hook with a cantilever mechanism is disposed on the side wall of the plug. When the socket and the hanging platform are inserted in the annular slot of the plug, the elastic hook on the side wall of the plug may engage with the hanging platform on the outer wall of the socket to achieve a secure connection and preventing detachment due to vibration or accidental contact when plugged in. When separation of the plug and socket is required, the elastic hook may be pulled, causing it to swing and disengage from the hanging platform on the outer wall of the socket.

The elastic hooks of the related art are usually designed in a seesaw-like structure. By pressing the elastic hook located at the end of the fulcrum facing away from the hook body, the elastic hook swings to a certain angle to disengage the hook body from the hanging platform.

This engagement of the elastic hook has the following disadvantages. The operation end of the elastic hook may be easily pressed inadvertently (e.g. by wires or other equipment) to make the plug and socket may not connect effectively and stably. This may lead to the plug and socket loosening on their own to affect the normal and stable transmission of signals. Furthermore, when a sufficiently large pulling force is applied to the plug, the cantilever structure of the elastic hook may deform, and that results in the separation of the hook body of the elastic hook from the hanging platform of the socket. The separation of the plug and the socket may release the lock therebetween and result in poor locking stability after the plug and socket are connected.

In view of the above drawbacks, the inventor proposes this disclosure based on his expert knowledge and elaborate researches in order to solve the problems of related art.

SUMMARY OF THE DISCLOSURE

One object of this disclosure is to provide a high-voltage energy storage quick connector that prevents the plug and socket from loosening due to accidental pressing, while enhancing the locking force between the plug and socket.

This disclosure is a high-voltage energy storage quick connector including a socket and a plug. The socket includes a hanging platform with a convex annular structure or a groove structure located on an outer circumference of the socket. An annular slot is defined on an inner side of the plug. The socket and the hanging platform are inserted in the annular slot of the plug. The plug includes an elastic hook configured in a cantilever structure on a side wall of the annular slot. The cantilever structure of the elastic hook extending axially along the plug in a free state. A hook on a free end of the elastic hook is engaged with a stepped surface of the hanging platform facing away from the plug. The plug includes an operating handle disposed along an elastic deformation direction of the elastic hook, and the operating handle is connected to the plug in a locking manner in the elastic deformation direction of the elastic hook.

In one embodiment, the operating handle is mounted on the cantilever structure of the elastic hook to slide along an extension direction of the cantilever structure to in a specific distance, the plug includes a handle positioning block protruded radially and outwardly on an outer circumferential wall of the plug, the plug includes a limiting slot extended along an axial direction of the plug, and one end of the operating handle is inserted in the limiting slot along a sliding direction thereof.

In one embodiment, a first bump is disposed on a side wall of one end of the operating handle along a slide direction of the operating handle, a second bump is disposed on a side wall of the limiting slot, and the second bump interferences with the first bump in a direction of relative sliding.

In one embodiment, the operating handle includes a sliding sleeve structure slidably disposed on an outside of the cantilever structure of the elastic hook, a limiting bump is disposed on a side wall of the cantilever structure of the elastic hook, an elongated limiting chute is defined on a side wall of the operating handle and extended along a direction of the operating handle 3 sliding relative to the elastic hook 22, the limiting bump is slidably inserted in the elongated limiting chute, and the limiting bump is stopped on two side walls of the elongated limiting chute along a direction of its length.

In one embodiment, a first handle positioning groove and a second handle positioning groove are defined on an outer side wall of the plug and arranged spacedly along a slide direction of the operating handle, the operating handle includes a handle positioning bump on a side wall of the sliding sleeve structure, the handle positioning bump is inserted either in the first handle positioning groove or the second handle positioning groove.

In one embodiment, a fulcrum elastic arm configured in a cantilever structure is disposed on a side wall of the sliding sleeve structure, the handle positioning bump is disposed on a side wall of a free end of the fulcrum elastic arm; two side walls of the handle positioning bump along a slide direction of the operating handle are in contact with the two side walls of the first handle positioning groove and the second handle positioning groove along the sliding direction of the operating handle through inclined surfaces.

In one embodiment, the plug includes a handle slideway extending along the slide direction of the operating handle, another end of the operating handle along the slide direction of the operating handle is inserted in the handle slideway; a setting gap is defined on an inner side wall of the handle slideway between a swing direction of the cantilever structure of the elastic hook 22 and an outer side wall of the operating handle, a radial limiting bump is disposed on the inner side wall of the handle slideway, an avoidance slot disposed radially and concavely to accommodate the radial limiting bump is defined on the outer side wall of another end of the operating handle; when the handle positioning bump of the operating handle is located in the first handle positioning groove, the radial limiting bump and the operating handle are in close contact to prevent the operating handle from swinging; when the handle positioning bump of the operating handle is located in the second handle positioning groove, the radial limiting bump directly face the avoidance slot on the outer side wall of the operating handle to allow the operating handle to swing by a set angle.

In one embodiment, the handle slideway includes an inverted L-shaped channel with a radial dimension at one end smaller than that of another end of the handle slideway; the operating handle includes an inverted L-shaped structure with the radial dimension at one end smaller than that of another end and corresponding to a shape of the handle slideway; step surfaces at both ends of the operating handle are stopped by step surfaces at both ends of the handle slideway; one end of the handle slideway closing to a side wall of the handle positioning bump of the operating handle along a swing direction of the operating handle forms an inclined surface consistent with the swing angle of the operating handle; an inner diameter of one end of the handle slideway corresponds to an outer diameter of one end of the operating handle, and an inner diameter of another end of the handle slideway is larger than an outer diameter of another end of the operating handle; and the radial limiting bump is located on an inner side of another end of the handle slideway, and the avoidance groove is located on an inner side of another end of the operating handle.

In one embodiment, the cantilever structure of the elastic hook is a bent structure with a free end tilted toward the annular slot; the free end of the cantilever structure of the elastic hook includes a reinforcing rib structure on a side wall facing away from the annular slot; the handle positioning block further includes an anti-off boss; a setting gap is defined between reinforcing ribs located at an end of the free end and a side wall of the cantilever structure of the elastic hook and the anti-off boss; and a distance from the anti-off boss to a bending point of the cantilever structure of the elastic hook is less than a length of an inclined bending structure at the free end of the elastic hook.

In one embodiment, a plurality of patterns that make friction with fingers and lock and unlock indicators are defined on a side wall of the operating handle; the operating handle includes an arcuate stepped surface to facilitate a swinging motion, and a curvature of the arcuate stepped surface matches that of human fingertips.

In comparison with the related art, the operating handle is mounted on the elastic hook of the plug. The operating handle drives the elastic hook to swing and release the engagement of the hanging platform of the socket. Additionally, the operating handle and the plug are connected and positioned. Once the operating handle is disengaged from the plug, the operating handle may be turned to drive the elastic hook to rotate and disengage the plug from the socket. The separation of the elastic hook and the hanging platform of the socket may not be achieved unless the operating handle is disengaged from the plug. Furthermore, the disengagement direction of the operating handle and the plug is perpendicular to the direction in which the elastic hook is driven to swing and disengage by pressing, and that makes the connection between the plug and the socket firmer and more stable after being plugged and locked. As a result, that prevents the elastic hook and operating handle from disengaging from the hanging platform due to external force when the plug and socket are engaged. The stability of the connection between the plug and socket is improved to ensure the stability of electrical signal transmission after connection. This disclosure also incorporates an anti-detachment structure to prevent the elastic hook from deforming and detaching from the hanging platform of the socket when the plug is forcibly pulled out. It ensures that the plug and socket may not be separated under any condition without operating according to the design. Therefore, the locking and holding force between the plug and the socket are effectively enhanced.

BRIEF DESCRIPTION OF THE DRAWINGS

The features of the disclosure believed to be novel are set forth with particularity in the appended claims. The disclosure itself, however, may be best understood by reference to the following detailed description of the disclosure, which describes a number of exemplary embodiments of the disclosure, taken in conjunction with the accompanying drawings, in which:

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
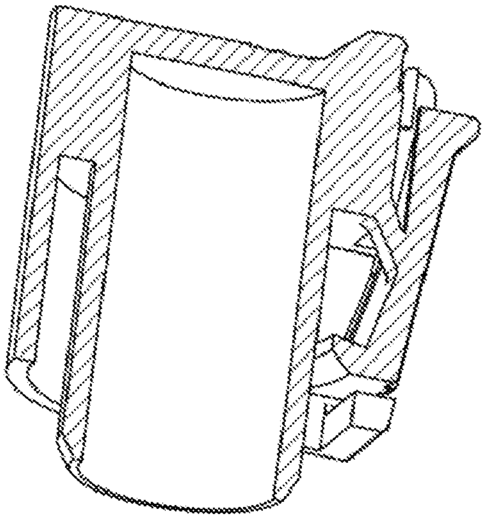
FIG.1 (Related art)
FIG. 1 is a cross-sectional schematic view of a plug structure of the related art.
Figure 2:
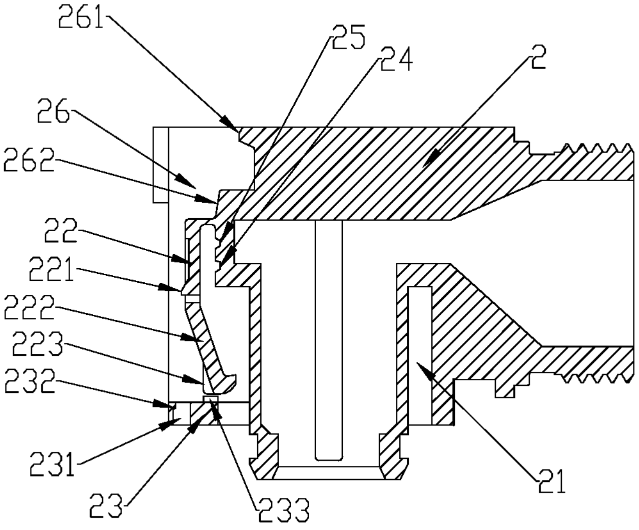
FIG. 2 is a cross-sectional schematic view of the plug of the first embodiment in this disclosure.
Figure 3:
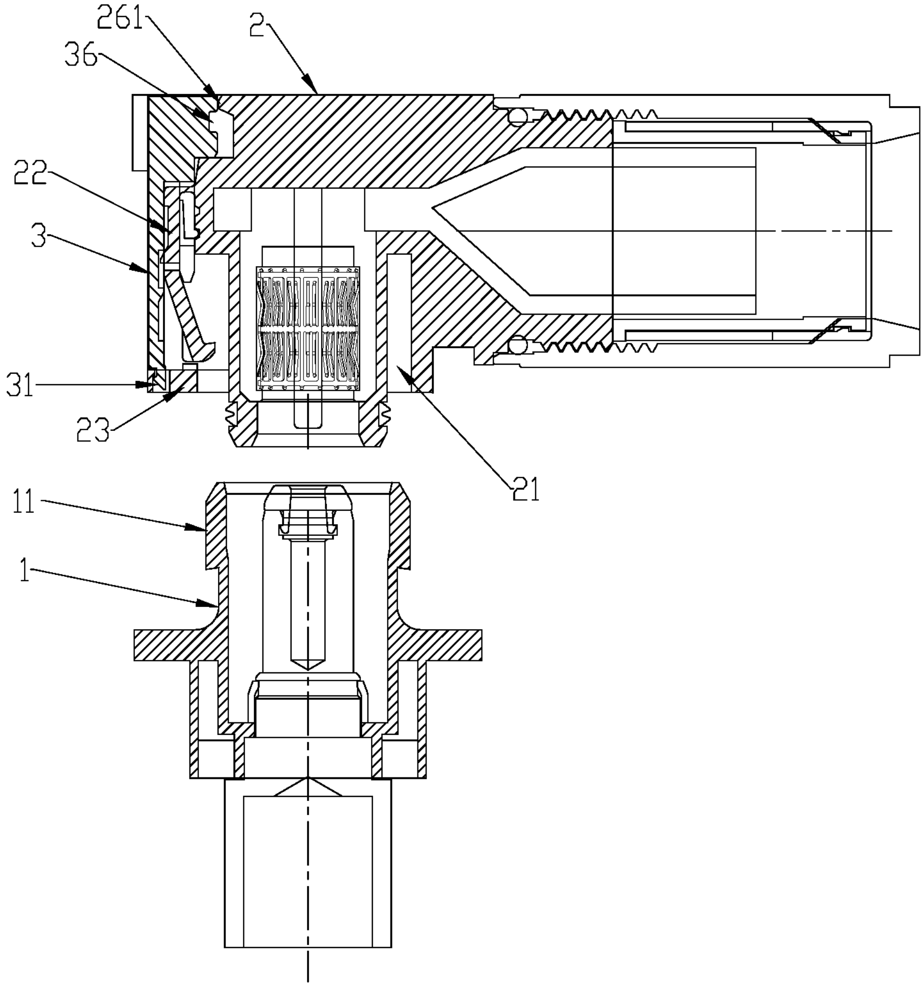
FIG. 3 is a separation schematic view of the plug of the first embodiment and the socket in this disclosure.

Please refer to FIG. 2 and FIG. 3, which depict a cross-sectional schematic view of the plug of the first embodiment in this disclosure and a separation schematic view of the plug of the first embodiment and the socket in this disclosure. This disclosure is a high-voltage energy storage quick connector including a socket 1 and a plug 2. The socket 1 includes a hanging platform 11 configured in a convex annular structure or a groove structure located on the outer circumference of the socket 1. An annular slot 21 is defined on the inner side of the plug 2. The socket 1 and the hanging platform 11 are inserted in the annular slot 21 of the plug 2. The plug 2 includes an elastic hook 22 configured in a cantilever structure and located on the side wall of the annular slot 21. The cantilever structure of the elastic hook 22 extends axially along the plug 2 in the free state. A hook located on the free end of the elastic hook 22 is engaged with the stepped surface of the hanging platform 11 facing away from the plug 2. The plug 2 includes an operating handle 3 disposed along the elastic deformation direction of the elastic hook 22. The operating handle 3 is connected to the plug 2 in the elastic deformation direction of the elastic hook 22.

Figure 4:
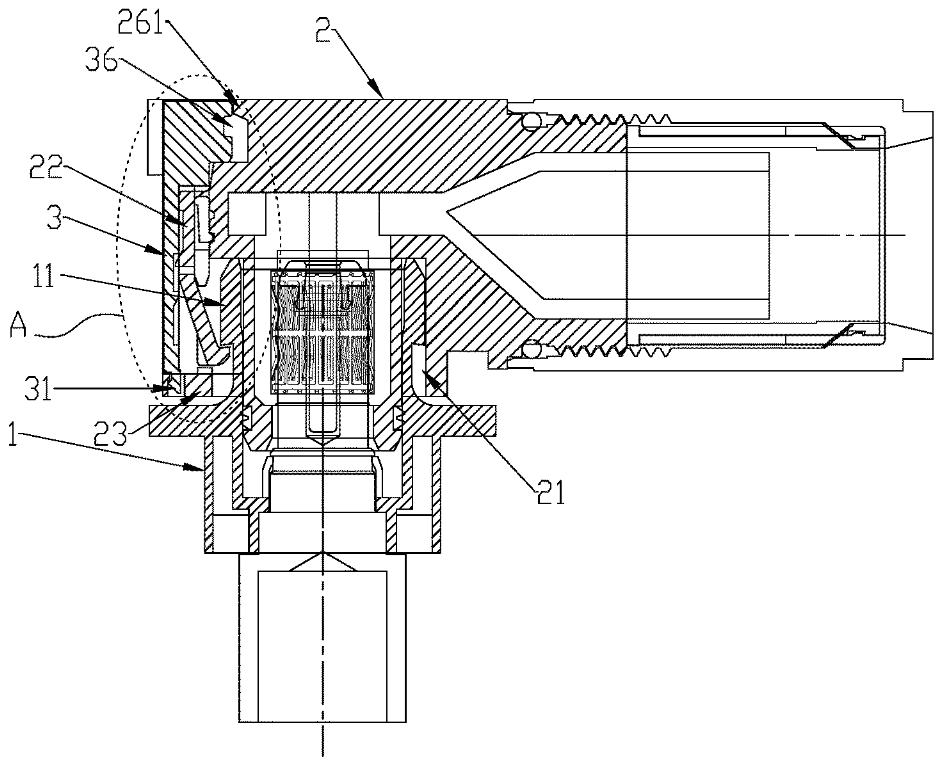
FIG. 4 is a locking schematic view of the plug of the first embodiment and the socket in this disclosure.
Figure 5:
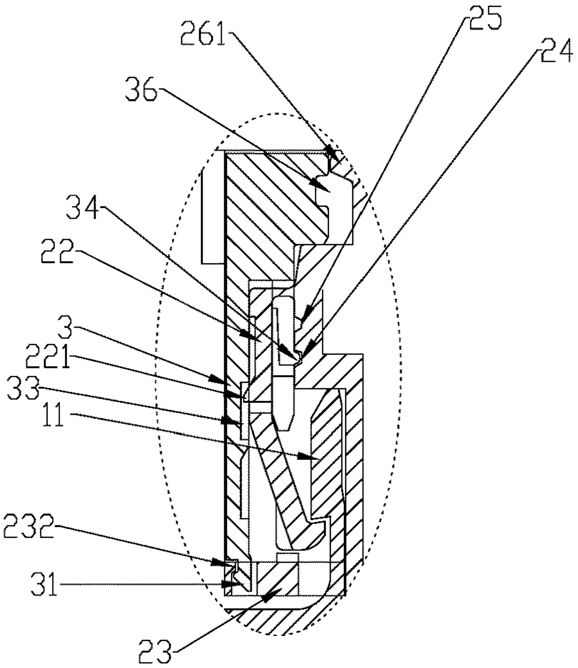
FIG. 5 is an enlarged view of the part A in FIG. 4.

Please further refer to FIG. 4 and FIG. 5, which depict a locking schematic view of the plug of the first embodiment and the socket in this disclosure and a partially enlarged schematic view in this disclosure. When the plug 2 and the socket 1 are connected, the elastic hook 22 is automatically engaged with the hanging platform 11 to secure the plug 2 and the socket 1. Subsequently, the operating handle 3 is attached to the plug 2. In the event of potential maloperations such as vibrations or pulling on the plug-in structure of the plug 2 and the socket 1, the operating handle 3 connected to the plug 2 ensures that the elastic hook 22 and the hanging platform 11 remain engaged. This prevents the plug 2 and the socket 1 from becoming unlocked and loosened due to external forces caused by maloperations, thereby maintaining a locked state. This structure feature enhances the stability of the connection between plug 2 and socket 1 to facilitate transmission of electrical signals therebetween and effectively preventing maloperation.

Please refer to FIG. 2, the operating handle 3 is mounted on the cantilever structure of the elastic hook 22 to slide along the extension direction of the cantilever structure. A handle positioning block 23 protrudes radially and outwardly on the outer circumferential wall of the plug 2. The handle positioning block 23 includes a limiting slot 231 extended along the axial direction of the plug 2. One end of the operating handle 3 is inserted in the limiting slot 231 along the sliding direction of the operating handle 3. The direction in which the operating handle 3 separating from the limit slot 231 is perpendicular to the direction in which the elastic hook 22 swings and disengages. This prevents the operating handle 3 from detaching from the plug 2 when the elastic hook 22 is pressed and swings, and that further enhances the locking stability of the connection between the plug 2 and the socket 1.

A first bump 31 is disposed on the side wall of one end of the operating handle 3 along its slide direction. A second bump 232 is disposed on the side wall of the limiting slot 231. The second bump 232 interferences with the first bump 31 in the direction of relative sliding. By inserting one end of the operating handle 3 in the limiting slot 231 of the handle positioning block 23, the first bump 31 on the side wall of one end of the operating handle 3 forms a blocking structure with the second bump 232 on the inner side wall of the limiting slot 231. Thus, the first bump 31 and the second bump 232 are engaged with each other. Both sides of the first bump 31 along the sliding direction thereof are in contact with the second bump 232 through inclined surfaces, ensuring that the operating handle 3 may be disengaged from the plug 2 and preventing situations that the operating handle 3 may not be disengaged.

Figure 10:
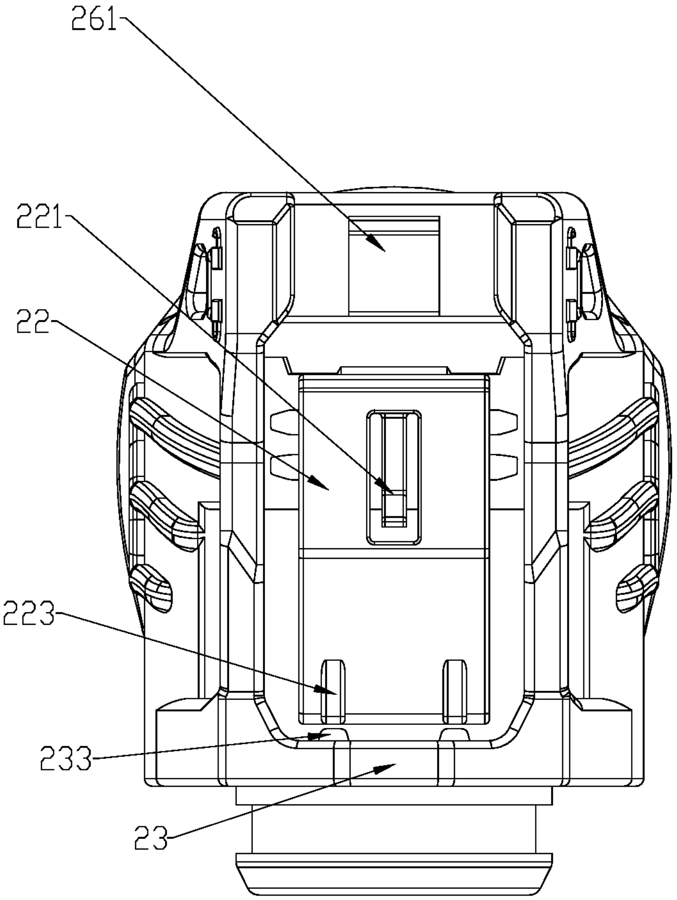
FIG. 10 is a front view of the plug of the first embodiment in this disclosure.
Figure 11:
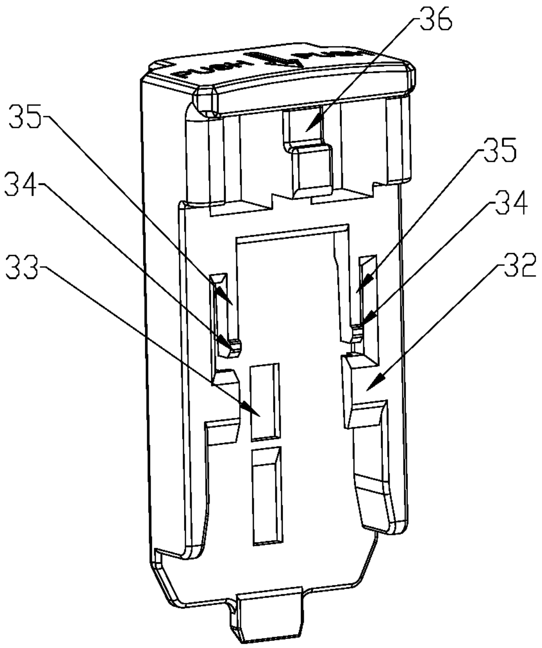
FIG. 11 is a first perspective schematic view of the operating handle in this disclosure.

Please refer to FIG. 10 and FIG. 11, which depict a front view of the plug of the first embodiment in this disclosure and a first perspective schematic view of the operating handle in this disclosure. The operating handle 3 includes a sliding sleeve structure 32 slidably disposed on the outside of the cantilever structure of the elastic hook 22. A limiting bump 221 is disposed on a side wall of the cantilever structure of the elastic hook 22. An elongated limiting chute 33 is defined on a side wall of the operating handle 3 and extended along the direction of the operating handle 3 sliding relative to the elastic hook 22. The limiting bump 221 is slidably inserted in the elongated limiting chute 33, and the limiting bump 221 is stopped on two side walls of the elongated limiting chute 33 along the direction of its length (refer to FIG. 5).

The side wall of the elastic hook 22 is connected to the outer side wall of the plug 2 through at least one connecting rib to configure a gap to accommodate the sliding sleeve structure 32 between the side wall of the elastic hook 22 and the outer side wall of the plug 2. The side wall of the sliding sleeve structure 32 may bypass the connecting rib of the elastic hooks 22 through openings, or the roots of the elastic hooks 22 may be extended reversely for a distance from the position of the connecting rib to form the handle connection section 224. The sliding sleeve structure 32 is mounted on the outside of the handle connecting section 224. Both structures achieve the connection between the root of the elastic hook 22 and the outer side wall of the plug 2 without affecting the mounting and sliding of the sliding sleeve structure 32 of the operating handle 3. Additionally, a T-shaped slot may also be defined on the operating handle 3, and a T-shaped bump may be disposed on the side wall of the cantilever structure of the elastic hook 22. By the T-shaped bump sliding in the T-shaped slot, the operating handle 3 and the elastic hook 22 may be slidably connected along the extension direction of the cantilever structure of the elastic hook 22. These structures are chosen by those skilled in the art according to actual needs, and they all fall within the scope of protection of this disclosure.

Moreover, a first handle positioning groove 24 and a second handle positioning groove 25 are defined on the outer side wall of the plug 2 and arranged spacedly along the slide direction of the operating handle 3. The operating handle 3 includes a handle positioning bump 34 on a side wall of the sliding sleeve structure 32. The handle positioning bump 34 is inserted in either the first handle positioning groove 24 or the second handle positioning groove 25. The handle positioning bump 34 inserted in the first handle positioning groove 24 or the second handle positioning groove 25 achieves the positioning of the operating handle 3 in two positions along the sliding direction of the operating handle 3.

A fulcrum elastic arm 35, configured in a cantilever structure, is disposed on a side wall of the sliding sleeve structure 32. The handle positioning bump 34 is situated on the side wall of the free end of the fulcrum elastic arm 35. The two side walls of the handle positioning bump 34, along the slide direction of the operating handle 3, are in contact with the two side walls of the first handle positioning groove 24 and the second handle positioning groove 25 along the slide direction of the operating handle 3 through inclined surfaces to ensure that the operating handle 3 slides smoothly. This design allows for automatic positioning when sliding to the locked and unlocked positions, and that may prevent inaccuracies in locking or the operating handle 3 from automatically returning to the locked state after unlocking.

Please refer to FIG. 2, the plug 2 includes a handle slideway 26 extending along the slide direction of the operating handle 3. Another end of the operating handle 3, along its slide direction, is inserted in the handle slideway 26. A setting gap is defined on the inner side wall of the handle slideway 26 between the swing direction of the cantilever structure of the elastic hook 22 and the outer side wall of the operating handle 3. A radial limiting bump 261 is disposed on the inner side wall of the handle slideway 26. An avoidance slot 36, disposed radially and concavely to accommodate the radial limiting bump 261, is defined on the outer side wall of another end of the operating handle 3. When the handle positioning bump 34 of the operating handle 3 is located in the first handle positioning groove 24, the radial limiting bump 261 and the operating handle 3 are in close contact to prevent the operating handle from swinging. When the handle positioning bump 34 of the operating handle 3 is positioned in the second handle positioning groove 25, the radial limiting bump 261 directly faces the avoidance slot 36 on the outer side wall of the operating handle 3, allowing the operating handle 3 to swing by the set angle.

Please refer to FIG. 2, 4 and FIG. 5, when the operating handle 3 slides to engage with the plug 2, the radial limiting bump 261 located on the side wall of the handle slideway 26 abuts against the side wall of another end of the operating handle 3. This prevents the operating handle 3 from swinging within the handle slideway 26 to prevent autonomous swinging of the elastic hook 22 due to vibration when the elastic hook 22 is in the locked state. When the operating handle 3 slides to the avoidance groove 36 facing the radial limiting bump 261 located on the side wall of the handle slideway 26, the operating handle 3 may swing to a certain angle to disengage the elastic hook 22.

The handle slideway 26 includes an inverted L-shaped channel, with the radial dimension at one end smaller than that of another end of the handle slideway 26. The operating handle 3 includes an inverted L-shaped structure, with the radial dimension at one end smaller than that of another end, corresponding to the shape of the handle slideway 26. The step surfaces at both ends of the operating handle 3 are stopped by step surfaces at both ends of the handle slideway 26. One end of the handle slideway 26, closer to the side wall of the handle positioning bump 34 of the operating handle 3 along the swing direction of the operating handle 3, forms an inclined surface 262 consistent with the swing angle of the operating handle 3. The inner diameter of one end of the handle slideway 26 corresponds to the outer diameter of one end of the operating handle 3. The inner diameter of another end of the handle slideway 26 is larger than the outer diameter of another end of the operating handle 3. The radial limiting bump 261 is located on the inner side of another end of the handle slideway 26. The avoidance groove 36 is located on the inner side of another end of the operating handle 3.

Figure 6:
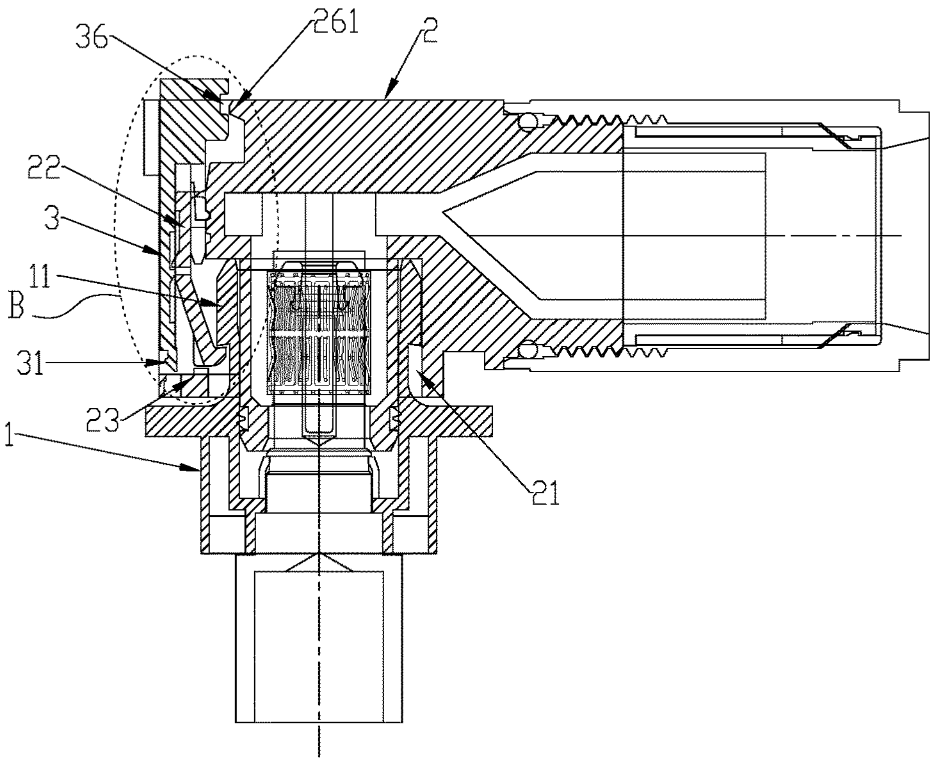
FIG. 6 is a disengagement schematic view of the operating handle and the plug of the first embodiment in this disclosure.
Figure 7:
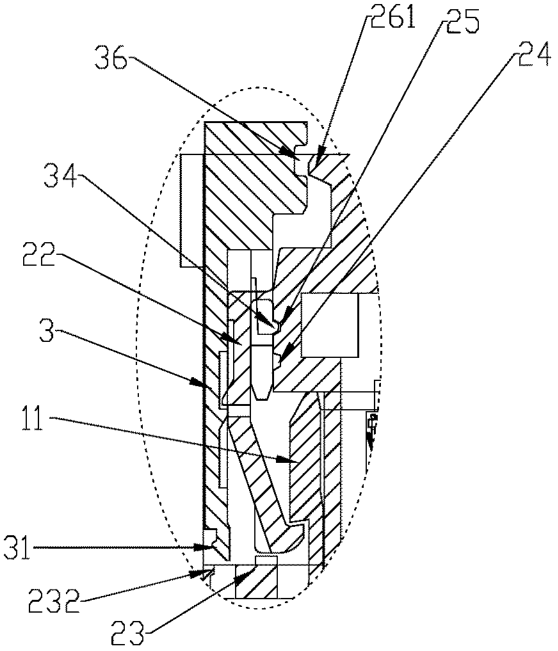
FIG. 7 is an enlarged view of the part B in FIG. 6.

Please further refer to FIG. 6 and FIG. 7, which depict a disengagement schematic view of the operating handle and the first embodiment of the plug and the socket in this disclosure and an enlarged view of part B in FIG. 6. When the plug 2 is separated from the socket 1, the operating handle 3 needs to be lifted upward first to disengage the first bump 31 from the second bump 232, and the radial limiting bump 261 is moved out of the avoidance groove 36.

Figure 8:
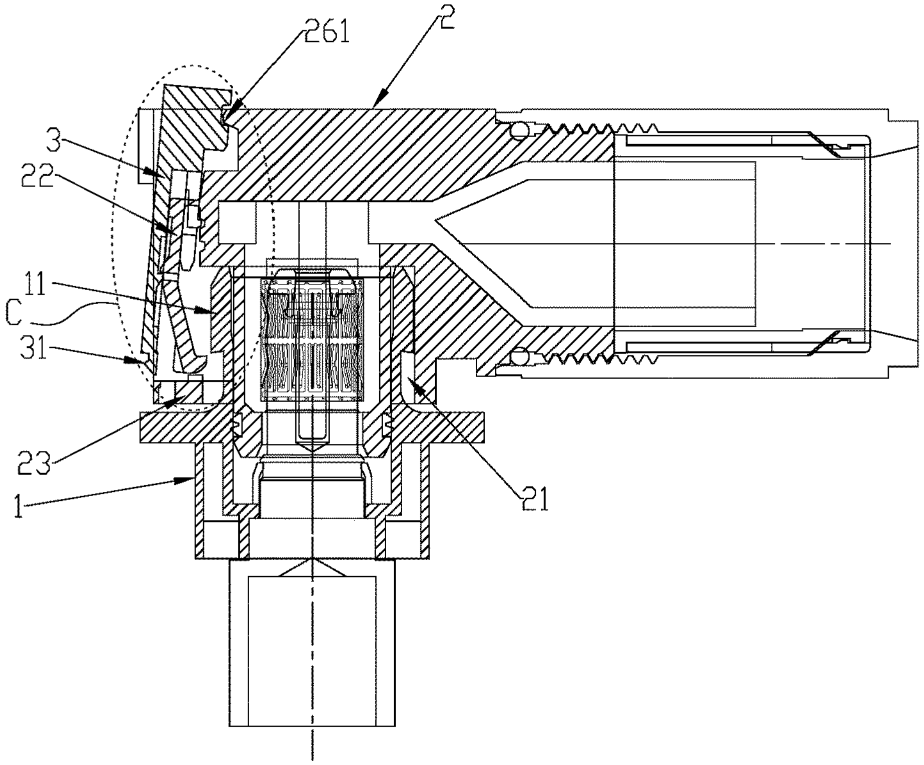
FIG. 8 is an unlocking schematic view of the plug of the first embodiment and the socket in this disclosure.
Figure 9:
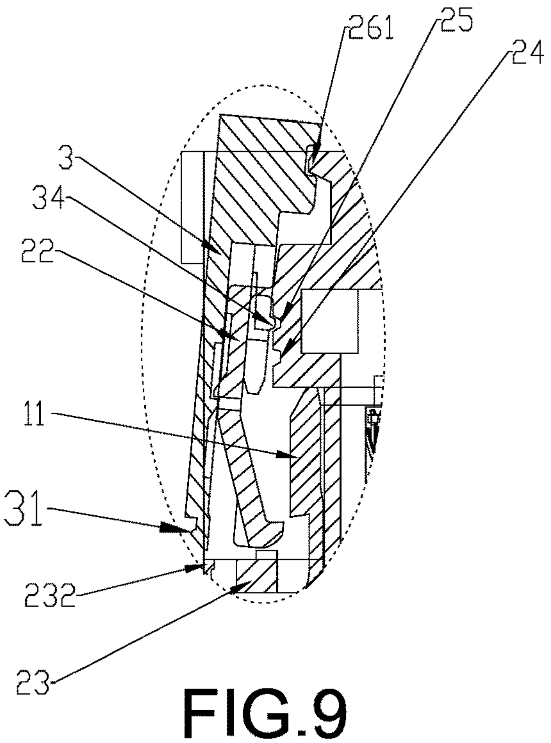
FIG. 9 is an enlarged view of the part C in FIG. 8.

Please refer to FIG. 8 and FIG. 9, which depict a disengagement schematic view of the socket and the first embodiment of the plug and the socket in this disclosure and a partially enlarged view in this disclosure. After lifting the operating handle 3 upward, the operating handle 3 is pressed to rotate to drive the elastic hook 22 to separate from the hanging platform 11 of the socket 1. During the swing of the operating handle 3, the side wall of the operating handle 3 and one end of the handle slideway 26 act as the centers of rotation. As the operating handle 3 swings to a specific angle, it is blocked by the inclined surface 262, preventing it from continuing to swing and thereby limiting the swing angle of the operating handle 3. These structures are chosen by those skilled in the art according to actual needs, and they all fall within the scope of protection of this disclosure.

Please further refer to FIG. 2 and FIG. 10, which depict a cross-sectional schematic view of the first embodiment of the plug in this disclosure and a front view of the first embodiment of the plug in this disclosure. The cantilever structure of the elastic hook 22 is a bent structure, with the free end tilted toward the annular slot 21. On the side wall facing away from the annular slot 21, the free end of the cantilever structure of the elastic hook 22 includes a reinforcing rib structure 223. The handle positioning block 23 further includes an anti-off boss 233. A setting gap is defined between the reinforcing ribs 223, located at the end of the free end and the side wall of the cantilever structure of the elastic hook 22, and the anti-off boss 233. The distance from the anti-off boss to the bending point of the cantilever structure of the elastic hook 22 is less than the length of an inclined bending structure 222 at the free end of the elastic hook 22. This structure enhances the strength of the inclined bending structure 222 of the elastic hook 22, and that may prevent the connection between the hook body and the cantilever structure of the elastic hook 22 from breaking and causing the hook to fall off when the plug 2 is pulled out.

Figure 12:
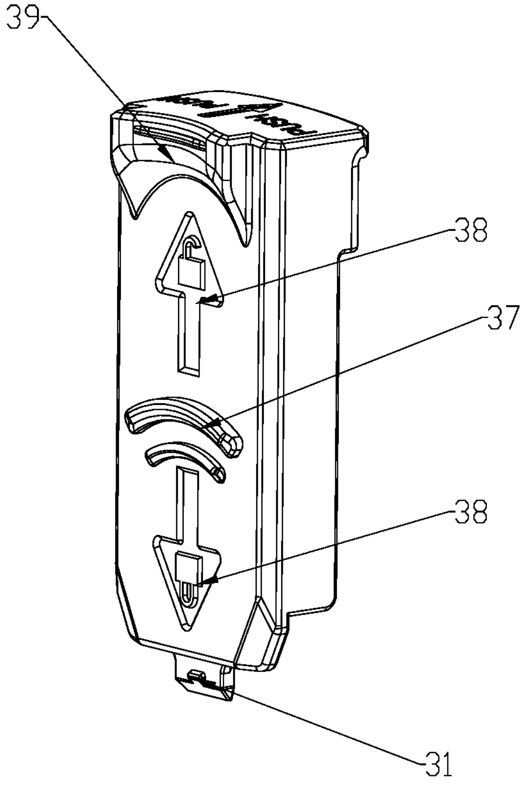
FIG. 12 is a second perspective schematic view of the operating handle applied to the plug of the first embodiment in this disclosure.

Please refer to FIG. 12, which depict a second perspective schematic view of the operating handle applied to the plug of the first embodiment in this disclosure. The side wall of the operating handle 3 is provided with patterns 37 that make friction with fingers, as well as lock and unlock indicators 38. Along the side wall at another end of the operating handle 3, in the direction of its sliding, there is also an arcuate stepped surface 39 designed to facilitate the swinging motion, and the curvature of the arcuate stepped surface 39 matches that of human fingertips. This design may facilitate the sliding and pressing of the operating handle 3.

Figure 13:
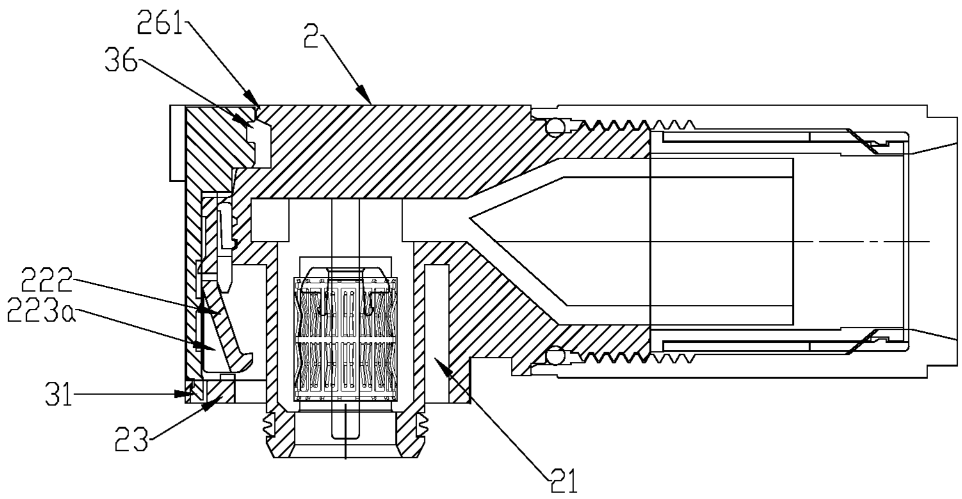
FIG. 13 is a cross-sectional schematic view of the plug of the second embodiment in this disclosure.

Please refer to FIG. 13, which is a schematic view of the plug of the second embodiment in this disclosure. The cantilever structure of the elastic hook 22 is a bent structure, with the free end tilted toward the annular slot 21. On the side wall facing away from the annular slot 21, the free end of the cantilever structure of the elastic hook 22 includes a reinforcing rib structure 223. In this embodiment, the width of the reinforcing rib structure **223*a* is larger than that of the reinforcing rib structure 223 disposed in the first structure (see FIG. 2). Furthermore, the reinforcing rib structure 223*a* is widened and pressed against the wall surface of the operating handle 3 to prevent accidental detachment of the operating handle 3** from its positioning.

Figure 14:
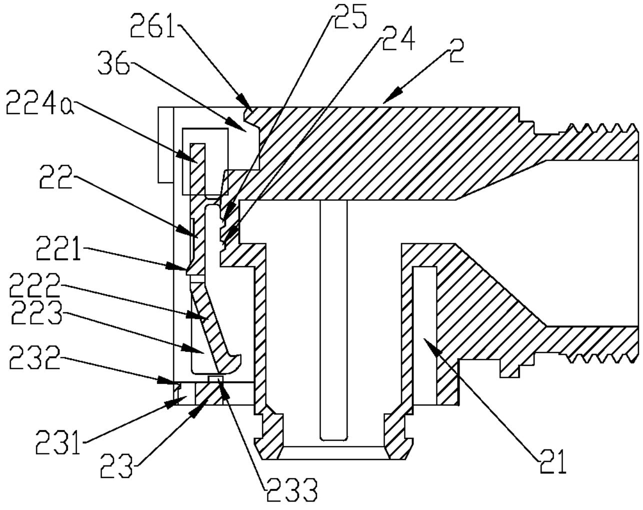
FIG. 14 is a cross-sectional schematic view of the plug of the third embodiment in this disclosure.
Figure 15:
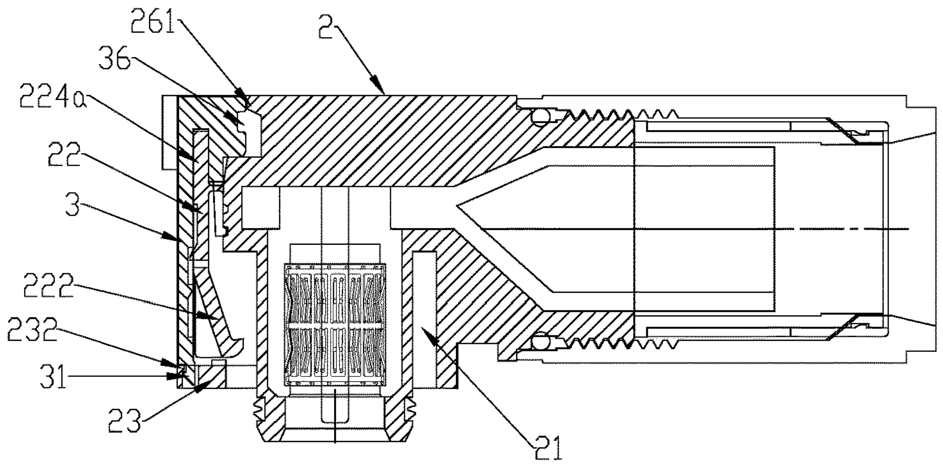
FIG. 15 is a locking schematic view of the plug of the third embodiment and the socket in this disclosure.

Please refer to FIG. 14 and FIG. 15, which depict a schematic view of the plug of the third embodiment in this disclosure and an engagement schematic view of the third embodiment in this disclosure. The root of the elastic hook 22 extends in a reverse direction from the position of the connecting rib for a certain distance to form the handle connecting section **224*a*. Additionally, an insertion corresponding to the handle connecting section 224*a* is defined on the operating handle 3, and the operating handle 3 is assembled on the outside of the handle connecting section 224*a***.

Figure 16:
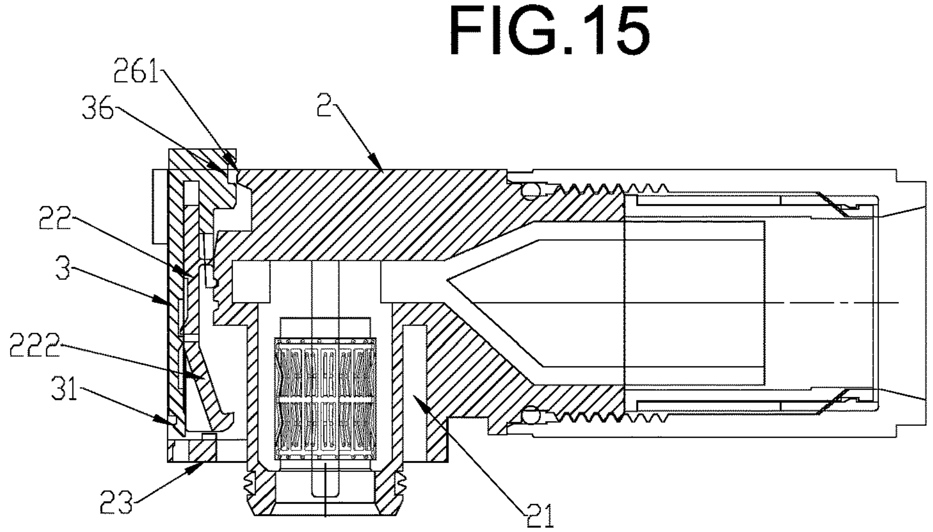
FIG. 16 is a disengagement schematic view of the operating handle and the plug of the third embodiment in this disclosure.
Figure 17:
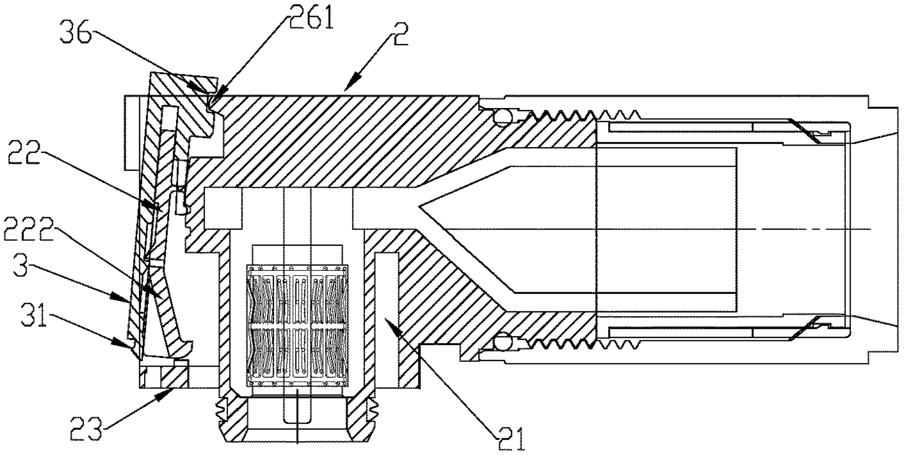
FIG. 17 is an unlocking schematic view of the plug of the third embodiment and the socket in this disclosure.

Please refer to FIG. 16 and FIG. 17, which are a disengagement schematic view of the operating handle and the plug of the third embodiment in this disclosure and a disengagement schematic view of the plug of the third embodiment in this disclosure. When the plug 2 is separated from the socket 1, the operating handle 3 needs to be lifted upward first to disengage the first bump 31 disengage from the second bump 232, and the radial limiting bump 261 is moved out from the avoidance groove 36. After lifting the operating handle 3 upward, the operating handle 3 is pressed to rotate to drive the elastic hook 22 to separate from the hanging platform 11 of the socket 1 (refer to FIG. 2 and FIG. 8).

While this disclosure has been described by means of specific embodiments, numerous modifications and variations could be made thereto by those skilled in the art without departing from the scope and spirit of this disclosure set forth in the claims.

What is claimed is:

1. A quick connector, comprising a socket and a plug, the socket comprising a hanging platform in a convex annular structure or a groove structure located on an outer circumference thereof, an annular slot defined on an inner side of the plug, the socket and the hanging platform inserted in the annular slot of the plug, the plug comprising an elastic hook in a cantilever structure located on a side wall of the annular slot, the cantilever structure of the elastic hook extending axially along the plug under a free state, a hook on an free end of the elastic hook engaged with a stepped surface of the hanging platform opposite to the plug;

wherein the plug comprises an operating handle disposed along an elastic deformation direction of the elastic hook, and the operating handle is connected to the plug by a locking manner in the elastic deformation direction of the elastic hook;

wherein the operating handle is slidably and distance-adjustably mounted on the cantilever structure and along an extension direction of the cantilever structure of the elastic hook, the plug comprises a handle positioning block disposed protrusively and radially on an outer circumferential wall thereof, the handle positioning block comprises a limiting slot extended along an axial direction of the plug, and one end of the operating handle is inserted in the limiting slot along a sliding direction thereof;

wherein the operating handle comprises a sliding sleeve structure slidably disposed on an outside of the cantilever structure of the elastic hook, a limiting bump is disposed on a side wall of the cantilever structure of the elastic hook, an elongated limiting chute is defined on a side wall of the operating handle and extended along a relative slide direction between the operating handle and the elastic hook, the limiting bump is slidably inserted in the elongated limiting chute, and the limiting bump is stopped on two side walls of the elongated limiting chute along a length direction.

2. The quick connector according to claim 1, wherein a first bump is disposed on a side wall of one end of the operating handle along a slide direction of the operating handle, a second bump is disposed on a side wall of the limiting slot, and the second bump interferences with the first bump in a direction of relative sliding.

3. The quick connector according to claim 1, wherein a first handle positioning groove and a second handle positioning groove are defined on an outer side wall of the plug and arranged spacedly along a slide direction of the operating handle, the operating handle comprises a handle positioning bump disposed on a side wall of the sliding sleeve structure, the handle positioning bump is inserted either in the first handle positioning groove or the second handle positioning groove.

4. The quick connector according to claim 3, wherein a fulcrum elastic arm in a cantilever structure is disposed on a side wall of the sliding sleeve structure, the handle positioning bump is disposed on a side wall of a free end of the fulcrum elastic arm; two side walls of the handle positioning bump along a slide direction of the operating handle are in contact with the two side walls of the first handle positioning groove and the second handle positioning groove along the sliding direction of the operating handle through inclined surfaces.

5. The quick connector according to claim 3, wherein the plug comprises a handle slideway extending along the slide direction of the operating handle, another end of the operating handle along the slide direction of the operating handle is inserted in the handle slideway; a setting gap is defined on an inner side wall of the handle slideway between a swing direction of the cantilever structure of the elastic hook and an outer side wall of the operating handle, a radial limiting bump is disposed on the inner side wall of the handle slideway, an avoidance slot is defined radially and concavely on the outer side wall of another end of the operating handle for accommodating the radial limiting bump; when the handle positioning bump of the operating handle is located in the first handle positioning groove, the radial limiting bump and the operating handle are in close contact to prevent the operating handle from swinging; when the handle positioning bump of the handle is located in the second handle positioning groove, the radial limiting bump directly face the avoidance slot on the outer side wall of the operating handle to allow the operating handle to swing by a set angle.

6. The quick connector according to claim 5, wherein the handle slideway includes an inverted L-shaped channel with a radial dimension at one end smaller than that of another end of the handle slideway; the operating handle comprises an inverted L-shaped structure with the radial dimension at one end smaller than that of another end and corresponding to a shape of the handle slideway; step surfaces at both ends of the operating handle are stopped by step surfaces at both ends of the handle slideway; one end of the operating handle slideway close to a side wall of the handle positioning bump of the operating handle along a swing direction of the operating handle forms an inclined surface consistent with the swing angle of the operating handle; an inner diameter of one end of the handle slideway is matched with an outer diameter of one end of the operating handle, and an inner diameter of another end of the handle slideway is larger than an outer diameter of another end of the operating handle; and the radial limiting bump is located on an inner side of another end of the handle slideway, and the avoidance groove is located on an inner side of another end of the operating handle.

7. The quick connector according to claim 1, wherein the cantilever structure of the elastic hook is a bent structure with a free end tilted toward the annular slot; the free end of the cantilever structure of the elastic hook comprises a reinforcing rib structure on a side wall opposite to the annular slot; the handle positioning block further comprises an anti-off boss; a setting gap is defined between reinforcing ribs located at an end of the free end and a side wall of the cantilever structure of the elastic hook and the anti-off boss; and a distance from the anti-off boss to a bending point of the cantilever structure of the elastic hook is less than a length of an inclined bending structure at the free end of the elastic hook.

8. The quick connector according to claim 1, wherein a plurality of patterns that make friction with fingers and lock and unlock indicators are defined on a side wall of the operating handle; the operating handle comprises an arcuate stepped surface to facilitate a swinging motion, and a curvature of the arcuate stepped surface matches that of human fingertips.

* * * * *